Oct. 9, 1934.　　　K. L. HERRMANN　　　1,976,613

ROLLER BEARING

Filed Nov. 2, 1933

INVENTOR.
Karl L. Herrmann
BY
ATTORNEYS.

Patented Oct. 9, 1934

1,976,613

UNITED STATES PATENT OFFICE 1,976,613

ROLLER BEARING

Karl L. Herrmann, South Bend, Ind.

Application November 2, 1933, Serial No. 696,405

1 Claim. (Cl. 308—214)

This invention relates to anti-friction bearings and particularly to self-contained combination radial and thrust bearings in which there are spaced rows of tapered rollers and an intermediate row of cylindrical rollers.

The principal object of my invention is to provide a bearing of the class described wherein the inner and outer race members are each formed of one piece and wherein there is means attached to the end face of the inner race member which is removable to permit loading and unloading of the rollers to thus provide for the assembly and disassembly of the bearings.

A further object of the invention is to provide a bearing of the class described in which the inner race member is provided with uninterrupted races for the rollers which are guided in the bearing by flanges integrally formed on the inner race member.

The above being among the objects of the present invention, the same consists of certain details of manufacture and construction which will be apparent in the drawing, the same being for the purpose of illustration only and not as limiting the scope of the invention.

Heretofore in the building of bearings having multiple rows of rollers, the same have usually been constructed with either a two-piece inner race member or a two-piece outer race member, or if perchance single-piece inner and outer race members were used, there was no adequate means to permit the easy assembly or disassembly of the bearing without destroying or damaging some of the working parts thereof.

Figure 1:
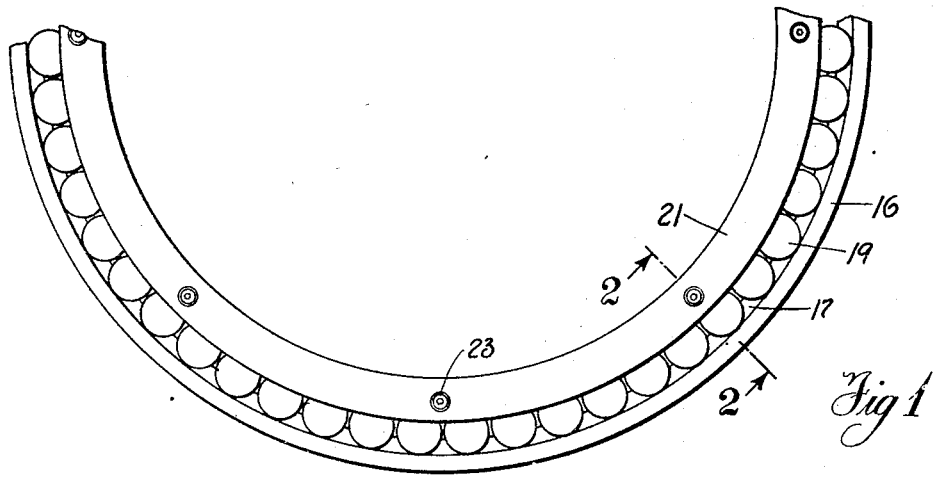
Fig. 1 is a fragmentary side elevation of the bearing including my invention.
Figure 2:
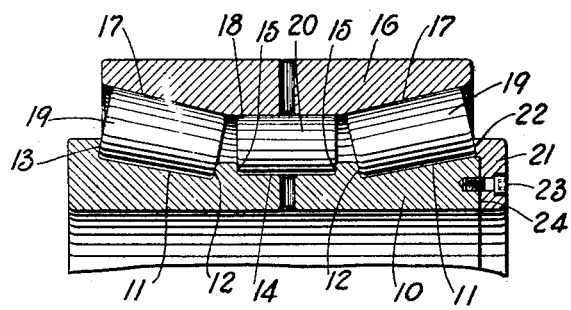
Fig. 2 is an enlarged fragmentary sectional view taken on the line 2—2 of Fig. 1.
Figure 4:
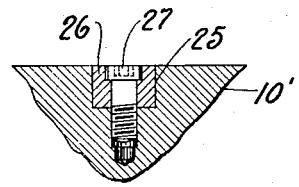
Fig. 4 is a detailed sectional view taken on the line 4—4 of Fig. 3.
Figure 3:
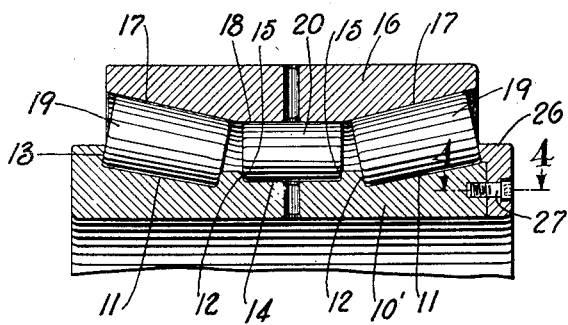
Fig. 3 is an enlarged fragmentary sectional view similar to Fig. 2, showing a slightly modified form of my invention.
Figure 5:
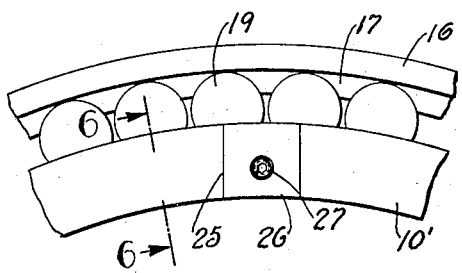
Fig. 5 is a fragmentary side-elevational view illustrating further the construction shown in Fig. 3.
Figure 6:
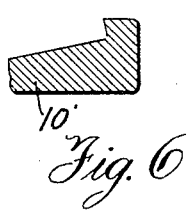
Fig. 6 is a fragmentary sectional view of the inner race member taken on the line 6—6 of Fig. 5.

To better understand the invention, reference may be had to Figs. 1 and 2 in which the inner race member 10 is provided with spaced tapered race-ways 11 having inner end walls 12, and one of which has an outer end wall 13. Intermediate the end walls 12 of the race-ways 11, I provide a cylindrical race-way 14 having end walls 15. The one-piece outer race member 16 is provided with converging faces 17 and an intermediate cylindrical face 18. Corresponding rows of tapered rollers 19 are interposed between the respective race-ways 11 and 17 formed on the inner and outer race members 10 and 16, and a row of cylindrical rollers 20, is interposed between the cylindrical race-ways 14 and 18.

As illustrated in Fig. 2, I provide an inexpensive and yet substantial means for maintaining the bearing in assembled relationship and to permit assembly and disassembly of the rollers in the race-ways. A ring 21 L-shaped in cross section positioned against the end face of the inner race member 10, has an inwardly extending projection 22 adapted to abut against the end face of the right-hand row of rollers 19 to provide a shoulder similar to the shoulder 13 at the left-hand side of the bearings, the ring being held in fixed position by the cap screws 23. If desired, the shims 24 may be interposed between the end face of the inner race member 10 and the ring 21 to permit adjustment of the ring relative to the race member and to take up any wear which might occur after long usage. In assembling the bearing as illustrated in Figs. 1 and 2, the left-hand row of tapered rollers 19 and the cylindrical rollers 20 are positioned in the respective race-ways after which the outer race member 16 is slipped over the rows of rollers to the position shown after which the right-hand row of rollers 17 are inserted in the right-hand race-ways and then the ring 21 is secured to the end face of the inner race member 10 whereby the rollers are retained in position against longitudinal movement and the bearing is completely assembled.

To disassemble the bearing for repair or replacement, it is not necessary to destroy any of the bearing parts as has been the practice in the past but on the contrary, the ring 21 may be removed after which the right-hand row of rollers 19 may be withdrawn from the bearing, the outer race member taken off and then the cylindrical rollers and left-hand row of tapered rollers may be removed; thus the bearing is completely disassembled and such repair or replacement as may be necessary can be made.

In the manufacture of the bearing there normally is a slight clearance between the end walls formed on the inner race member and the respective rows of rollers. As the parts become worn in use the ring 21 may be removed and one of the shims 24 taken out whereby any looseness or play in the bearing can be taken up and the bearing is again in good condition for further use.

In Figs. 3, 4, 5 and 6 I have shown a slightly modified form of my invention which includes an inner race member 10' substantially like the inner race member shown in Fig. 2 and which includes converging race-ways 11, inner end walls 12 therefor and outer end walls 13. Also there is provided a cylindrical race-way 14 provided with end walls 15. The outer race member 16 may be identical with the outer race member shown in Fig. 2 and has converging race-ways 17 and an intermediate cylindrical face 18 so that the rows of tapered rollers 19 may be interposed between the respective race-ways 11 and 17 on the inner and outer race members, and the cylindrical rollers 20 may be interposed between the cylindrical faces 14 and 18.

In the modified form as shown in Figs. 3, 4, 5 and 6, the end walls 13 of the inner race member 10 are identical except that in one end face thereof I provide a slot 25 in which is mounted a keeper 26 secured in position by the cap screw 27. In this construction, when it is desired to remove the rollers 19 from the bearing or disassemble the bearing, the keeper 26 is removed from the slot 25 whereupon one or more of the rollers 19 may be removed from the bearing to permit the outer race member 16 to be slid over the rollers and thus disassemble the respective parts.

While I have not shown any retainers for the rollers in either of the modifications illustrated, it is to be understood that my invention is not limited to a bearing of the full roller type but that if desired any suitable form of retainer may be used.

While I have shown two embodiments of the present invention, it will be well understood to those skilled in the art that various changes and modifications can be made without departing from the spirit and scope of the invention, and I, therefore, desire to claim the invention broadly as well as specifically as is indicated by the appended claim.

What I claim is:

An anti-friction bearing comprising, an inner race member having spaced converging race-ways and an intermediate cylindrical race, a shoulder having a cylindrical face formed on said inner race member at one side thereof, shoulders having cylindrical faces formed on said inner race member separating said cylindrical race and converging race-ways, a one-piece outer race member having spaced converging race-ways and a cylindrical race mating with the respective race-ways and cylindrical race on said inner race member, rows of rollers interposed in said respective converging race-ways and between said cylindrical races, and a ring L-shaped in cross section detachably secured to the end face of said inner race member opposite to the end having the shoulder thereon having an inwardly extending projection seating on said inner race member and having a face abutting against the end faces of the respective row of rollers to provide a shoulder therefor.

KARL L. HERRMANN.